United States Patent [19]

Gianessi

[11] 4,257,647
[45] Mar. 24, 1981

[54] DUAL LATCH OF DRIVER'S CHAIR

[75] Inventor: Albert Gianessi, East Peoria, Ill.

[73] Assignee: Caterpillar Tractor Co., Peoria, Ill.

[21] Appl. No.: 5,731

[22] Filed: Dec. 21, 1978

[51] Int. Cl.³ .............................................. A47C 1/00
[52] U.S. Cl. .................................. 297/336; 248/397; 292/35; 292/166; 297/328; 297/364
[58] Field of Search ............... 297/336, 335, 328, 344, 297/337, 364, 216; 292/35, 36, 41, 166, 168; 248/140, 397, 384, 371; 108/6; 296/65 A

[56] References Cited

U.S. PATENT DOCUMENTS

| | | | |
|---|---|---|---|
| 1,006,211 | 10/1911 | Hermon | 292/36 |
| 1,417,239 | 5/1922 | Forbes | 292/169.11 |
| 1,908,958 | 5/1933 | Coffron | 292/169.16 |
| 2,310,346 | 2/1943 | Bell | 297/337 X |
| 2,560,459 | 7/1951 | Lundberg et al. | 292/35 |
| 2,772,905 | 12/1956 | Dusing | 292/36 |
| 3,144,270 | 8/1964 | Bilancia | 297/337 X |
| 3,158,398 | 11/1964 | Stryker | 297/337 X |
| 3,731,962 | 5/1973 | Enochian | 292/34 |
| 3,877,748 | 4/1975 | Eggert | 297/216 |
| 3,879,082 | 4/1975 | Gwin | 292/29 X |
| 3,957,304 | 5/1976 | Koutsky et al. | 297/216 X |
| 4,040,660 | 8/1977 | Barecki | 297/216 X |

Primary Examiner—William E. Lyddane
Attorney, Agent, or Firm—Wegner, Stellman, McCord, Wiles & Wood

[57] ABSTRACT

A latch assembly for a pivoted vehicle seat (14) which provides sufficient locking capability to permit a seat belt (15) to be mounted on the frame (10) of the seat as opposed to the base (16) of the vehicle. The latch assembly includes two slidable horizontally spaced apart latch blocks (20,20') mounted on the frame (10) of the seat (14) for engaging base mounted catches (22,22'). Two actuator arms (48,48') coupled to the frame, are operatively connected to each latch block (20,20') and are secured to and positioned by an operator actuated release member (36). Movement of the actuator arms (48,48') causes the latch blocks (20,20') to disengage the base (16) mounted catches (22,22') substantially simultaneously.

8 Claims, 8 Drawing Figures

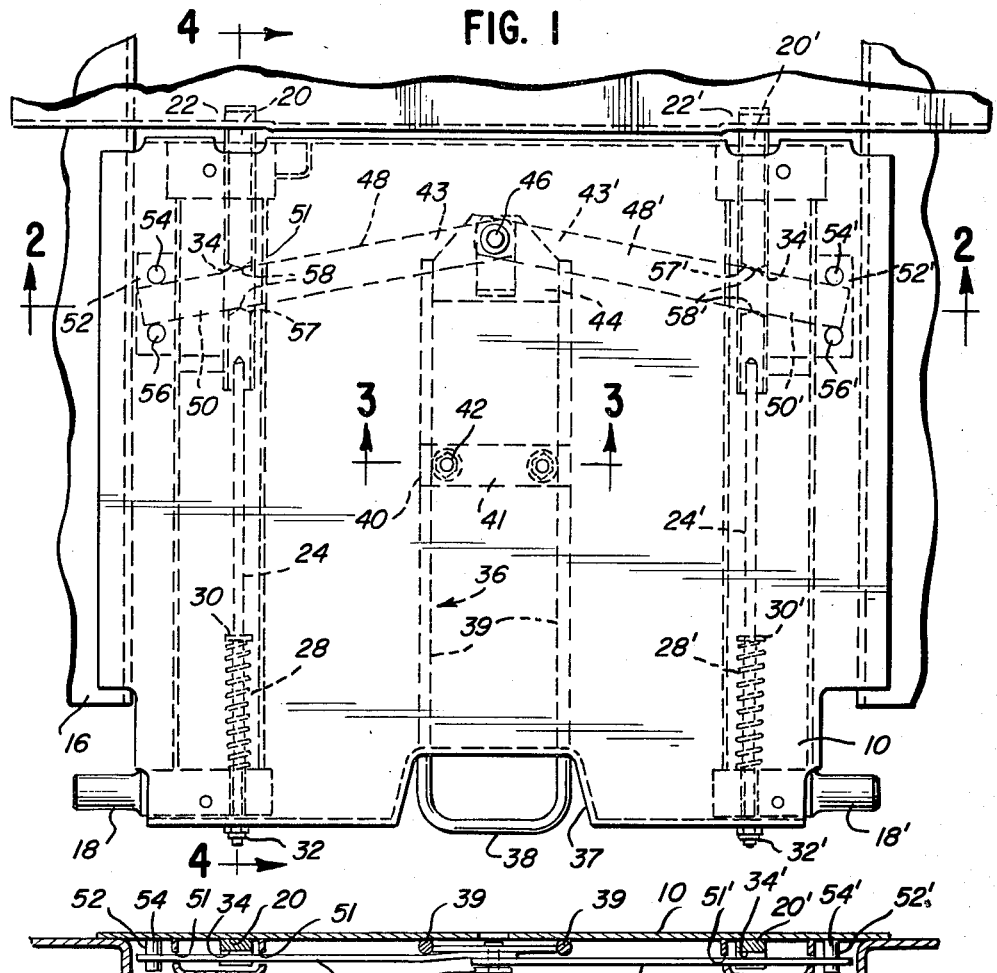

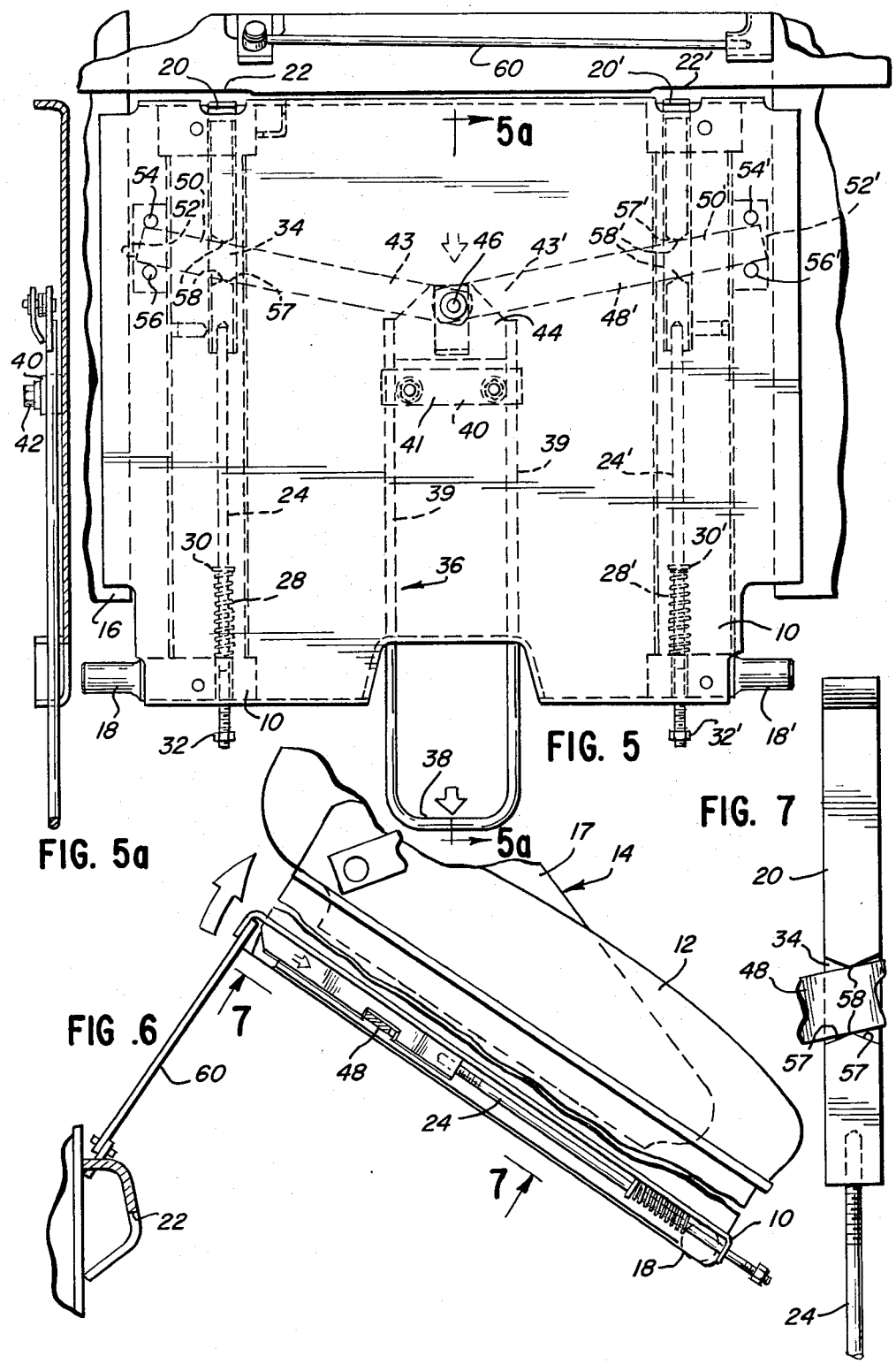

DUAL LATCH OF DRIVER'S CHAIR

DESCRIPTION

1. Technical Field

This invention relates to vehicle seats adapted to be pivoted about a horizontal axis and more particularly to a seat latching assembly for improved restraint during rapid deceleration of the vehicle.

2. Background Art

Seats for vehicles, such as earth-working equipment and tractors, often include a frame with a cushion mounted thereon wherein the frame has a horizontal axis about which the seat is permitted to pivot for operator access to a compartment below. Generally, a latch assembly retains the seat in position and if the operator desires access to the compartment or to the area behind the seat, the latch is released and the seat is pivoted about the horizontal axis. Gwin, U.S. Pat. No. 3,879,082, issued Apr. 22, 1975, discloses such a seat mounted for rotation about the base or pedestal of the vehicle.

The locking mechanism for retaining the seat in position consists of a locking member connected in a scissors fashion and adapted to be moved from a locking position into an unlocked position by a knee-actuated release member.

The seats of the type discussed above are usually provided with a seat belt for the operator. The seat belt arrangement is secured to the frame of the vehicle. The seat belt has not been secured to the seat frame because the seat locking assembly cannot be relied upon to restrict pivotal motion of the seat in the event of an accident or sudden stop.

Other locking assemblies cannot satisfactorily be relied upon to hold the seat in position in the event of rapid deceleration of the vehicle. For example, Forbes, U.S. Pat. No. 1,417,239, issued May 23, 1922, entitled Latch Device for Vehicle Doors, and Coffron, U.S. Pat. No. 1,908,958, issued May 16, 1929, entitled Automobile Doorlock, disclose door latch or lock arrangements employing only a single catch which would not be considered satisfactory if employed to arrest the pivotal motion of a vehicle seat having a seat belt mounted on the seat.

U.S. Pat. No. 3,731,962 to Samuel H. Enochian, issued May 8, 1973, entitled Latch Operating Mechanism for Bulkheads, shows two pairs of latches operated by a single actuator for securing a bulkhead between two sections of a boxcar, or the like. The use of two pairs of latches and a pivoted actuator for a seat latching device is not practical.

DISCLOSURE OF INVENTION

In one aspect of the invention, a latch assembly is provided for a frame pivotably mounted about a base. The assembly includes at least two latch blocks which are movable between a base engaging and a base disengaging position. A single operator-actuatable release member is secured to the latch blocks which, when pulled, positively and simultaneously move the latch blocks into the base disengaging position.

The latch assembly is particularly advantageous for use with pivoted vehicle seats since the assembly is sufficiently strong to withstand additional load requirements as during rapid deceleration of the vehicle. Moreover, since both latch blocks are secured to a common release member, a positive and simultaneous release of both latch blocks is assured.

Since both latch blocks are simultaneously actuated by one hand manipulation of the release member, the other hand is left free to perform other operations, such as pivoting the seat forward and the like.

BRIEF DESCRIPTION OF DRAWINGS

FIG. 1 is a top view of the seat frame having a latch assembly of an embodiment of the present invention engaged with a base-mounted catch;

FIG. 2 is a cross-sectional view taken along the line 2—2 in FIG. 1;

FIG. 3 is a cross-sectional view taken along the line 3—3 of FIG. 1 showing the release member and an associated guide;

FIG. 4 is a cross-sectional view taken through the line 4—4 of FIG. 1 illustrating the spring loaded bars and the latch blocks;

FIG. 5 is a top view of the seat frame showing the latch assembly of FIG. 1 disengaged from the base-mounted catch;

FIG. 5a is a cross-sectional view taken along the line 5a—5a of FIG. 5;

FIG. 6 is a side view of a cushion mounted on the frame to form a seat which is pivoted or rotated forwardly for operator access below; and FIG. 7 is a view taken along the line 7—7 of FIG. 6 illustrating the latch block and a portion of a spring-loaded bar.

BEST MODE FOR CARRYING OUT THE INVENTION

Referring to FIGS. 1 through 4, a seat frame 10 provides support for a bottom cushion 12 mounted thereon to form the lower portion of a seat 14. Seat belt 15 is secured at 13 to frame 10 and seat 14. The seat 14 includes side frames 17 which interconnect the bottom cushion 12 and a back 19 together as a unit. Frame 10, and hence seat 14, is pivotably mounted on a base 16 of a vehicle (not shown) by pins 18 and 18'. In FIG. 1, the sockets for pivotally supporting the pins 18,18' are not shown, since the pivotal mounting of the seat is conventional.

The seat frame 10 has a pair of elongate latch blocks 20 and 20' which engage base-mounted catches 22 and 22', respectively, to retain seat 14 in the position shown in FIG. 4. When the latch blocks 20 and 20' are disengaged from the catches 22 and 22', the operator is able to pivot or rotate seat 14 forward, or clockwise, to the position shown in FIG. 6.

Although the seat 14 is shown to be rotatable about pins 18 and 18', it is understood that the latch assembly of the present invention operates equally well with a seat having only a bottom cushion 12 and wherein the back cushion is bolted or affixed to the vehicle.

Latch block 20 and catch 22 are parallel to and horizontally spaced apart from latch block 20' and catch 22' so that the entire seat 14 is restrained from rotation when the latch blocks 20 and 20' are in a catch-engaging position with the base 16 of the vehicle. This configuration assures that the seat 14 will not rotate about pins 18 and 18' as a result of the forward momentum of the operator (who is restrained by seat belt 15) when the vehicle experiences sudden deceleration.

Latch blocks 20,20' are coupled to rods 24,24', respectively, for reciprocal movement within U-shaped housings 26,26' fastened beneath frame 10. Rods 24,24' are provided with compression springs 28,28' which act upon plates 30,30' secured to rods 24,24' and upon frame 10 to urge latch blocks 20,20' into engagement with catches 22,22'. The ends of rods 24,24' are threaded to receive nuts 32,32', which nuts abut frame 10 for adjusting the position of latch blocks 20,20' with respect to catches 22,22'. Latch blocks 20,20' are provided with slots 34,34' intermediate the length of the blocks, the purpose of which will be described.

A release member 36 has a handle portion 38 and two spaced apart parallel rods 39 extending from the handle to the rear of seat 14. The handle 38 lies parallel to the front of the seat 14 just below and inside the front edge of the seat. A cutout 37 is provided in the seat frame 10 so as to permit ready insertion of a hand for releasing the seat latch. Rods 39 are slidably retained on the seat frame 10 by guide plate 40 and spacer 41 (FIGS. 1 and 3) which are held in place by nut and bolt assemblies 42. The ends of rods 39 are secured to a plate 44 carrying a transversely extending pin 46 upon which the proximal ends 43,43' of the outwardly extending actuator arms 48 and 48' are pivotally mounted. The arms 48,48' are retained on the pin by a washer 47 and key 49 (FIG. 2). Actuator arms 48 and 48' extend through openings 51,51' (FIG. 2.) in the walls of the U-shaped housings 26,26' and through slots 34 and 34', respectively, of latch blocks 20 and 20'. The distal ends 50 and 50' of actuator arms 48 and 48' are retained by pin assemblies 52 and 52' secured to frame 10 outboard of the latch blocks 20,20'. The pin assemblies 52,52' include posts 54,56 and 54',56' which are spaced apart by a distance greater than the width of the distal ends 50,50' of the actuator arms 48, 48' for free axial and pivotal movement therebetween.

As shown in FIGS. 1, 5 and 7, each slot 34 and 34' is provided with spaced side walls 57,57' with each wall shaped to form an apex or point 58,58'. The points 58,58' in each slot are in alignment with each other with the space between the points 58,58' being slightly greater than the width of the arms 48,48' to enhance pivotable motion of the actuator arms 48 and 48' with respect to latch blocks 20 and 20'.

Industrial Applicability

Assuming that an operator of a vehicle having the seat 14 with the latch assembly herein described desires to pivot or to rotate the seat, he pulls handle 38 forward to the position seen in FIG. 5. The rods 39 slide relative to the guide plate 40 to pull the pin 46 and proximal ends 43,43' of the arms 48,48' forward whereupon the distal ends 50,50' move axially and rotate between the fixed posts 54,56, 54',56' bringing with them the latch blocks 20,20'. The latch blocks 20,20' are moved longitudinally against the force of the springs 28, 28' as the arms 48,48' apply force to the front apex or point 58,58' of the slots 34, 34' in the blocks 20, 20'. With the handle 38 forward, the latch blocks 20,20' clear the catches 22,22' on the base 16 of the vehicle whereupon the seat 14 may be grasped by the free hand of the operator and pivoted upward. An appropriate bar 60 nested below the rear of the seat 14 (FIG. 5) can be pivoted upward to support the seat in the raised position of FIG. 6.

When the operator releases the handle 38, springs 28 and 28' urge latch blocks 20 and 20' toward the rear portion of frame 10 taking with them the arms 48,48' which are pivoted about the posts 54,56, 54',56' by the force applied to arms 48,48' by the rear apexes or points 58,58' of the slots 34,34'. The proximal ends 43,43' of the arms 48,48' and pin 46 will pull the release member 36 rearward into position ready to be used again to release the seat. The handle 38 of release member 36 is released as soon as the latch blocks 20,20' clear the catches 22,22' whereupon the latch blocks 20,20' are extended rearward of the seat frame 10. Upon lowering the rear of the seat, the angled faces of the latch blocks 20,20' will contact the tops of the catches 22,22' and will urge the latch blocks 20,20' and rods 24, 24' against the springs 28,28' to compress the springs and permit the latch blocks 20,20' to clear the tops of the catches 22,22'. The latch blocks 20,20' will then be guided into the position whereby the springs 28,28' will drive the latch blocks into latched position with the catches 22,22'.

When the seat 14 is in the latched position, latch blocks 20 and 20' engage catches 22 and 22' and the operator of the vehicle may then assume a seated position and secure the seat-mounted seat belt 15 around his waist. The two latch blocks 20,20' engaged within their respective catches 22,22' assure the positive retention of the seat 14 against rotation or pivoting developed by momentum, as during a sudden deceleration.

I claim:

1. A latch assembly for a seat pivotably mounted about a base (16), comprising:
    a seat frame (10);
    a first latch means (20,24) mounted on said seat frame (10) and having a latch block (20) movable between a base engaging and a base disengaging position;
    a second latch means (20',24') mounted on said frame (10) and having a latch block (20) movable between a base engaging and a base disengaging position;
    a first actuating arm (48) extending substantially transversely through a slot (34) in said first latch block (20);
    a secnd actuating arm (48') extending substantially transversely through a slot (34') in said second latch block (20');
    a single releasing means (36) carried by said seat frame and coupled to overlapping proximal end portions (43,43') of said first (48) and second (48') actuating arms; and
    pivot means (52,52') carried by the seat frame (10) and engaging, respectively, with a distal end portion (50,50') of said first and said second actuating arms (48,48'), said releasing means being moved to pivot said actuating arms to move said latch blocks (20,20') simultaneously from a catch (22) engaging position to a catch disengaging position.

2. The latch assembly of claim 1 including
    spring means (28,28') for urging said first and second latch means (20,24,20',24') in a direction to seat said latch blocks (20,20') into said base (16) engaging position.

3. the latch assembly of claim 1 wherein said seat frame (10) includes a cushion (12) to form a seat (14) for a vehicle and further including:
    a seat belt (15) secured to said seat frame.

4. The latch assembly of claim 1 wherein said single release means (36) lies substantially parallel to said seat frame for linear movement in a direction parallel to the direction of movement of said latch means (20,24, 20',24'), said release means simultaneously moving said first and second actuating arms (48,48') and said first and second latch means (20,20', 24,24'); and
    spring means (28) for retaining said first and second latch means (20,20') in said base engaging position.

5. The latch assembly of claim 1 wherein each said pivot means (52,52') for pivotably connecting said first and second arms (48,48') to said seat frame includes:
a pair of spaced apart members (54,56, 54',56') on said frame with each actuating arm (48, 48') being slidably and pivotally retained between said spaced apart members.

6. In a vehicle seat (14) on a frame (10) pivotably mounted about a horizontal axis (18) on the base of the vehicle, having a latch assembly for restraining pivotal motion of said seat (14) comprising:
a release member (36) coupled to the frame (10);
a first actuator arm (48) having a proximal end (43) and a distal end (50);
a second actuator arm (48') having a proximal end (43') and a distal end (50');
means (46) connecting said release member (36) to the proximal ends (43,43') of the first and second actuator arms (48,48');
a first means (52) on the frame (10) for pivotably receiving the distal end (50) of the first actuator arm (48);
a second means (52') on the frame (10) for pivotably receiving the distal end (50') of the second actuator arm (48');
a first latch block means (20) mounted on the frame (10) and movable between a base (16) engaging position and a base disengaging position;
a second latch block means (20') mounted on the frame (10) and movable between a base (16) engaging position and base disengaging position;
coacting means (34) on said first latch block means (20) receiving said first actuator arm (48); and
a second coacting means (34') on said second latch block means (20') receiving said second actuator arm (48'),
said release member (36) pivots said actuator arms (48,48') about said first and second means (52,52') on the frame (10) with said actuator arms (48,48') bearing on said coacting means (34,34') to move said first and second latch block means (20,20') into and out of said base disengaging position.

7. The latch assembly of claim 6 wherein each coacting means is a slot (34,34') with a first side and a second side which meet at a point (58,58') to enhance pivotable movement of the actuator arm (48,48') with respect to the latch block means (20,20');
and wherein movement of said release member (36) is in a linear direction within the general plane of the latch assembly.

8. The latch assembly of claim 6 wherein a seat belt (15) is secured to said vehicle seat (14).

* * * * *